United States Patent [19]

Tyul'ga et al.

[11] Patent Number: 5,719,259
[45] Date of Patent: Feb. 17, 1998

[54] PERFLUOROALKYLENE OXIDE COPOLYMER COMPOSITION CONTAINING FUNCTIONAL GROUPS

[75] Inventors: Galina Mikhailovna Tyul'ga; Olga Borisovna Platonova, both of St. Petersburg; Irina Gennadievna Solodkaya, Pushkin; Dimetrii Stefanovich Rondarev, St. Petersburg; Yurii Kalmanovich Starobin, St. Petersburg; Sergey Vasilievich Sokolov, St. Petersburg, all of Russian Federation; Albertus VanCleeff, Wilmington, Del.

[73] Assignee: E. I. du Pont de Nemours and Company, Wilmington, Del.

[21] Appl. No.: 698,555

[22] Filed: Aug. 12, 1996

Related U.S. Application Data

[60] Provisional application No. 60/002,271, Aug. 14, 1995.

[51] Int. Cl.[6] .................................................. C08G 65/22
[52] U.S. Cl. ........................ 528/402; 528/361; 528/366; 528/370; 528/371; 528/372; 528/401
[58] Field of Search ...................... 528/361, 366, 528/370, 371, 402, 401, 372

[56] References Cited

U.S. PATENT DOCUMENTS 3,366,610  1/1968  Anderson .
3,660,315  5/1972  Hill et al. .
4,363,898  12/1982  Krespan et al. .......................... 528/361
4,384,128  5/1983  Krespan et al. .
4,454,072  6/1984  Siegemund et al. .
4,647,413  3/1987  Savu .
5,149,842  9/1992  Sianesi et al. .

FOREIGN PATENT DOCUMENTS 928315  6/1963  United Kingdom .

OTHER PUBLICATIONS

Chem. Abs. vol. 99, No. 11, Sep. 1983; Abstract No. 87583.

Chem. Abs. vol. 101, No. 3, Jul. 1984; Abstract 22748.

Derwent Abstract, JP 1163173, Tokuyama Soda KK, Jun. 27, 1989.

Primary Examiner—James M. Seidleck
Attorney, Agent, or Firm—Marilyn H. Bromels

[57] ABSTRACT

Perfluoroalkylene oxide copolymer having acid fluoride moieties are prepared by reaction of hexafluoropropylene oxide and 1,2-epoxypentafluoropropane 3-fluorosulfate in the presence of a cesium alkoxide initiator. The copolymers may be cured at room temperature and are useful in sealant and coating formulations. Derivatives of the copolymers containing ester, amide, nitrile, and ether moieties are also disclosed.

9 Claims, No Drawings

PERFLUOROALKYLENE OXIDE COPOLYMER COMPOSITION CONTAINING FUNCTIONAL GROUPS

This application is a continuation of provisional application 60/002,271 filed Aug. 14, 1995.

BACKGROUND OF THE INVENTION

This invention relates to polyfunctional perfluoropolymers. In particular, this invention relates to functionalized copolymers of hexafluoropropylene oxide (HFPO) and perfluoroalkylene oxides.

Bifunctional HFPO polymers having molecular weights of 3,000 to 6,000 which contain terminal COF, COOCH$_3$, CONH$_2$, and CN groups are known compositions which are disclosed, for example, in U.S. Pat. No. 3,660,315. Such polymers may be produced by polymerization of HFPO, followed by conversion of the initially formed polymeric alkoxide end groups to acid fluoride, ester, amide, or nitrile moieties. That is, in a first step, HFPO is polymerized in the presence of a bifunctional cesium dialkoxide initiator of the formula CsOCF$_2$CFOCF$_2$CF$_2$OCFCF$_2$OCs
  |              |
  CF$_3$         CF$_3$ in a solvent comprising an ethylene glycol ether, such as tetraglyme, preferably at temperatures of −30° C. to −60° C. The initially formed polymer contains —CF$_2$O$^-$Cs$^+$ end groups which are converted to acid fluorides by heating the polymer at about 105° C.–155° C. The acid fluoride groups may then be converted to various derivatives using appropriate reagents. For example, nitrile-terminated poly-HFPO may be prepared by treatment of the poly-HFPO acid fluoride with methanol, followed by amidation of the thus-formed ester with ammonia, and dehydration of the amido groups with P$_2$O$_5$ to convert the latter to nitriles. The nitrile terminated poly-HFPO may then be cured by reaction of the terminal cyano groups with consequent formation of triazine rings. However, an elastomeric material will not be obtained, due to the insufficient number of functional groups present.

Copolymers of HFPO and perhalogenated epoxy olefins containing a perfluorovinyl group of the general formula

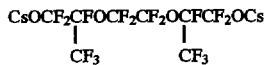

where
X=F, Cl;
n=0–10; and
M$_n$=3800–4100 are disclosed in U.S. Pat. No. 3,366,610. In one example, copolymerization is carried out in glass ampoules in the presence of CsF activated with tetraglyme in a molar ratio of 1:1. Reaction takes place in the range of −27° C. to −45° C. over a period of more than 60 hours. The liquid polymer thus obtained is distilled under vacuum at a residual pressure of 0.05–4.5 mm Hg and a temperature of 255° C. The yield of polymer is no more than 65%. When exposed to UV light, the liquid copolymer is converted to a very viscous material having minimal strength at room temperature. Such polymers are not useful as sealants or coatings.

Also known are polymers of HFPO with perfluoroglycidyl ethers of the general formula

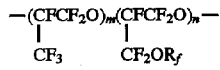

where
M$_n$ is 9,000–45,000;
n:m=9:1 to 100:1 and
R$_f$=—CF$_2$CF$_2$SO$_2$F, —(CF$_2$)$_4$COF, —CF$_2$CF$_2$CN, —C$_6$F$_5$, —CF$_2$CF(CF$_3$)OCF$_2$CN, or CF$_2$CF$_2$OC$_6$F$_5$ As disclosed in U.S. Pat. No. 4,384,128, these copolymers may be obtained by the copolymerization of HFPO with perfluoroglycidyl ethers of the formula

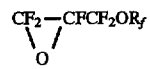

where
R$_f$=—CF$_2$CF$_2$SO$_2$F, —(CF$_2$)$_4$COF, —CF$_2$CF$_2$CN, —C$_6$F$_5$, or —CF$_2$CF(CF$_3$)OCF$_2$CF$_2$CN, at a temperature of −32° C. to −35° C. for 42 to 76 hours in the presence of hexafluoropropylene as a solvent, and an initiator consisting of the reaction product of cesium fluoride, HFPO tetramer, and tetraglyme. Upon completion of the polymerization, the reaction mixture is degassed under vacuum at 100° C. and the product is recovered. The product, having acid fluoride and sulfonyl fluoride groups, may then be converted by known methods to functionalized polymers containing —COOCH$_3$, —COOH, —CONH$_2$, —COCl, —SO$_2$OK, and —SO$_2$OH groups. This synthetic method is the closest analog to the present invention. However, it does not permit preparation of perfluoroalkylene oxide copolymers that cure at room temperature. Vulcanization of the polymers thus obtained is performed at elevated temperatures (180° C. or higher) by various methods, depending on the functional groups present. In particular, an oligomer containing sulfonyl fluoride groups is cured to form a rubber-like material by reaction with hexamethylenediamine carbamate in the presence of magnesium oxide by heating for two hours at 180° C. in a mold. An oligomer containing the perfluorophenoxy group is cured with the dipotassium salt of bisphenol A in the presence of dicyclohexyl-18-crown-6 ether, in a nitrogen stream for 3 days, followed by post cure for 1 day at 300° C., resulting in formation of a rubber-like material having a glass transition temperature (T$_g$) of −58° C.

SUMMARY OF THE INVENTION

The present invention is directed to perfluoroalkylene oxide copolymers which are curable at room temperature to produce elastomeric compositions having physical properties which permit their use in solvent-free sealants and protective coatings. Specifically, the present invention comprises hexafluoropropylene oxide copolymers having copolymerized units of hexafluoropropylene oxide and another perfluoroalkylene oxide containing functional groups, wherein the copolymers are of the general formula

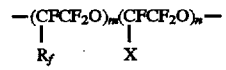

where
X=COF, COOR, CONH$_2$, CONR$^1$R$^2$, CN, COOH, or CH$_2$OH R, R$^1$, and R$^2$=C$_1$–C$_8$ alkyl or C$_1$–C$_8$ fluoroalkyl;

$R_f = C_1-C_8$ perfluoroalkyl;

m:n=2:1 to 50:1; and $M_n$=7,000 to 14,000.

The present invention is further directed to a process for the production of perfluoroalkylene oxide copolymers which comprises A) providing a solution of an initiator composition which is a complex of a) a cesium alkoxide of a hexafluoropropylene oxide oligomer and b) a poly(ethylene glycol) dimethyl ether in an inert solvent;

B) mixing hexafluoropropylene oxide and 1,2-epoxypentafluoropropane 3-fluorosulfate, in a ratio of 2:1 to 50:1 with said initiator composition in a polymerization reaction zone to form a perfluoroalkylene oxide copolymer having cesium alkoxide moieties; and C) heating said perfluoroalkylene oxide copolymer having cesium alkoxide moieties to generate acid fluoride end groups, thereby forming a perfluoroalkylene oxide copolymer having the formula

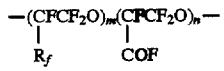

where m:n=2:1 to 50:1.

DETAILED DESCRIPTION OF THE INVENTION

The copolymers of the present invention are compositions comprising copolymerized units derived from hexafluoropropylene oxide (HFPO) and a fluorinated epoxy compound. The copolymers are compositions of the general structure

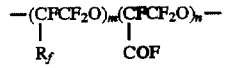

having a number average molecular weight, $M_n$, of 7,000 to 14,000 where m:n is 2:1 to 50:1. They may be synthesized via a process which involves, as a first step, copolymerization of hexafluoropropylene oxide (HFPO) and 1,2-epoxypentafluoropropane 3-fluorosulfate, which is a compound of the formula

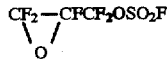

1,2-epoxypentafluoropropane 3-fluorosulfate may be prepared by oxidation of perfluoroalkyl fluorosulfate as described in Japanese Kokai Patent Application 1-163173.

The molar ratio of HFPO to 1,2-epoxypentafluoropropane 3-fluorosulfate is from 2:1 to 50:1, preferably 4.5:1 to 11:1. Further, the reaction takes place in the presence of at least 0.01 mole percent of an initiator, based on the number of moles of HFPO. Preferably, 1.3–1.7 mole percent of initiator, based on the number of moles of HFPO is employed.

The initiator is a complex of a cesium perfluoroalkoxide of an HFPO oligomer and a poly(ethylene glycol) dimethyl ether. Cesium alkoxides of hexafluoropropylene oligomers of the general formula $CF_3CF_2CF_2(OCF(CF_3)CF_2)_xOCs$, where x is 1 to 5 are suitable for use in forming the initiators, and alkoxides wherein x is 1 are preferred. The initiators are stable complexes of these cesium alkoxides with at least one poly(ethylene glycol) dimethyl ether. Suitable poly(ethylene glycol) dimethyl ethers include diethylene glycol dimethyl ether (diglyme), triethylene glycol dimethyl ether (triglyme), and tetraethylene glycol dimethyl ether (tetraglyme). Of these, tetraglyme is preferred. Generally, the ether should be anhydrous. The molar ratio of cesium perfluoroalkoxide to ether is 1:1.2 for the cesium HFPO oligomer tetraglyme complex.

Preferably, the reaction is carried out in the presence of a solvent inert to the reactants, for example a perfluoroaromatic compound, such as perfluorotoluene, or perfluoroxylene. Generally, about 1 to 99 parts by weight of solvent is utilized per part of initiator. Preferably, the amount of solvent utilized is 1–10 parts by weight per part of initiator. Most preferably, the amount of solvent used is 1.5–3.0 parts by weight per part of initiator.

In the instance where a perfluoroaromatic compound is utilized as a solvent, the copolymerization is accelerated if acetone is employed. Generally, the acetone is present in an amount of 15–25 percent by weight of the initiator.

The polymerization reaction produces a polymer having cesium alkoxide moieties. When heated, these compositions liberate sulfuryl fluoride to form the copolymers of the present invention. For example, an amount of 1,2-epoxypentafluoropropane 3-fluorosulfate which is less than 20 percent of the total amount to be supplied is added to a stirred reaction vessel containing a solution of the initiator in a poly(ethylene glycol) dimethyl ether. HFPO and 1,2-epoxypentafluoropropane 3-fluorosulfate are then added simultaneously at such a rate that when all the 1,2-epoxypentafluoropropane 3-fluorosulfate has been added, about 7–10 percent of the HFPO remains to be added. The reaction mixture is agitated for a period of generally about an hour and the remaining HFPO is then added and the mixture is agitated for an additional period of time, generally about two hours. The reaction mass is heated to at least room temperature to liberate sulfuryl fluoride, and the copolymer solution is decanted from the spent initiator. At this point, an infrared spectrum of the solution indicates acid fluoride groups are present in the polymer.

Isolation of the copolymeric acid fluoride may be carried out by devolatilization of the polymer solution, generally under vacuum at a pressure of 0.5–1 mm Hg and at a temperature of about 300° C. The process produces a copolymer of the general structure

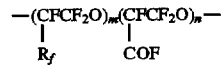

having a number average molecular weight, $M_n$, of 7,000 to 14,000. Yields are generally at least 90%. The copolymeric acid fluorides are characterized by having glass transition temperatures, $T_g$, of from about −45° C. to −70° C.

The copolymers may be prepared by continuous or batch polymerization.

The HFPO copolymers of the invention may be transformed into other useful derivatives by reaction of the pendant acid fluoride groups, i.e. —COF groups, with appropriate reagents. For example, copolymers containing carboxylic acid groups may be prepared by reacting the —COF-containing copolymers with water; copolymers containing ester groups may be prepared by reaction of the COF-containing copolymers with alcohols; copolymers containing amide groups may be prepared by reaction of the COF-containing copolymers or their ester derivatives with ammonia or an amine; and copolymers containing nitrile groups may be prepared by dehydration of the amide-containing copolymer derivatives.

The copolymers of the present invention are useful as components of sealant and coating formulations which are curable at room temperature.

In the following examples of specific embodiments of the present invention, parts and percentages are by weight and all temperatures are in degrees Centigrade unless otherwise specified.

EXAMPLE 1

An initiator consisting of a complex of cesium alkoxide of HFPO dimer with tetraglyme of the formula

was prepared by adding 10 g of CsF (dried in vacuo at 250° C. for 8 hours) to 26.6 g of the dimer of HFPO under argon with vigorous stirring. Within 1–2 hours, 17.5 g of absolute tetraglyme (i.e. free of water and alcohols) was added and the reaction mixture stirred for another 4–5 hours at 30°–40° C. Excess dimer was then removed in vacuo.

A 10 g sample of the initiator was charged to a reactor equipped with a mixer with a shielded motor. The initiator was dissolved in 15 g perfluorotoluene, and the contents of the reactor were cooled to –30° C. to –33° C. A 1.6 g (0.0065 mole) sample of 1,2-epoxypentafluoropropane 3-fluorosulfate was added with stirring over a period of 0.5 hours. After the reaction mass had been agitated under these conditions for two hours, 135 g (0.081 moles) HFPO and 18.3 g (0.074 moles) of 1,2-epoxypentafluoropropane 3-fluorosulfate were added simultaneously over a period of 8 hours at a temperature of –32° C. to –35° C. The reaction mixture was stirred for an additional 2 hours at –30° C. to –33° C. at which time 15 g (0.09 moles) of HFPO was added over a period of 2 hours at a temperature of –32° C. to –35° C. The resultant mixture was agitated at this temperature for a further 3 hours after completion of the addition o the HFPO. The reaction mixture was gradually brought to room temperature, and the sulfuryl fluoride produced was removed. The reaction mass was allowed to settle and the polymer solution (i.e. the lower organofluorine layer) was decanted from the precipitated spent initiator. The upper organic layer was separated from the product and the product was devolatilized under vacuum at 0.5–1 mm Hg at a temperature of 300° C., yielding 12 g of a low molecular weight fraction and 148 g of bottoms containing the product in a yield of 90%. An infrared spectrum of the solution prior to devolatilization indicated the presence of acid fluoride groups at 1870 cm$^{-1}$. The number average molecular weight of the product was approximately 7000 and the $T_g$ was –65° C. Elemental Analysis: Calc'd.: C: 21.93, F: 67.51; Found: C: 22.3, F: 68.1. An infrared spectrum of the product indicated absorption at 1870 cm$^{-1}$. $^{19}$F NMR data indicated the polymer contained structural units consisting of

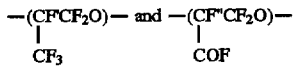

where the peak corresponding to F' was at 143 ppm, the peak corresponding to F''' was at 130 ppm, and the ratio of intensities of F' and F''' was 11:1.

A 20 g sample of the copolymer product was cured at room temperature with 1.2 g of a mixture of m- and p-xylylene diamine (3:1). The cured polymer was aged for 3 days at room temperature. The cured product had a tensile strength of 1.4 MPa, an elongation at break of 180%, and a compression set of 10%. Tensile strength and elongation at break were determined according to ASTM D-412 and compression set was determined according to USSR Standard GOST 9.029-74.

EXAMPLE 2

A 10 g (0.013 mole) sample of the initiator of Example 1 was charged to a reactor equipped with a mixer with a shielded motor. The initiator was dissolved in 20 g perfluorotoluene, and the contents of the reactor were cooled to –32° C. to –35° C. A 150 g (0.90 mole) sample of HFPO and a 21.6 g (0.99 mole) sample of 1,2-epoxypentafluoropropane 3-fluorosulfate were added with stirring over a period of 8 hours at rates of 18.8 g/hour and 2.7 g/hour, respectively. After completion of the comonomer addition, the reaction mixture was stirred for an additional 3 hours at a temperature of –32° C. to –35° C. The reaction mixture was gradually brought to room temperature, and the sulfuryl fluoride produced was removed. The bottoms were isolated according to the method described in Example 1. The product obtained was reacted with 20 ml of methanol with subsequent devolatilization of the polymer under vacuum a temperature of 150° C. to remove methanol and the hydrogen fluoride which was generated. 150 g of polymeric ester product having a number average molecular weight of approximately 81500 and a $T_g$ of –63° C. was obtained in a yield of 91%. Elemental Analysis: Calc'd.: C: 22.47, H:0.17, F: 65.91; Found: C: 22.9, H: 0.20-, F: 65.8. An infrared spectrum of the product indicated absorption at 1780 cm$^{-1}$, indicating the presence of methyl ester moieties. $^{19}$F NMR data indicated the polymer contained structural units consisting of

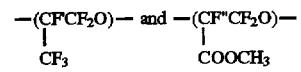

where the peak corresponding to F' was at 143 ppm, the peak corresponding to F''' was at 130 ppm, and the ratio of intensities of F' and F''' was 10:1.

Cure of the product was carried out substantially as described in Example 1. The cured product had a tensile strength of 4.0 MPa, an elongation at break of 120%, and a compression set of 5%. Tensile strength and elongation at break were determined according to ASTM D-412 and compression set was determined according to USSR Standard GOST 9.029-74.

EXAMPLE 3

Copolymerization of 166 g (1.0 mole) HFPO and 26.7 g (0.11 mole) of 1,2-epoxypentafluoropropane 3-fluorosulfate was carried out substantially as described in Example 1 in the presence of 10 g (0.013 mole) of initiator in a solution of 30 g of perfluorotoluene with addition of 2.0 g of acetone. At the onset of polymerization 2.7 g of 1,2-epoxypentafluoropropane 3-fluorosulfate was added and the reaction mass was agitated for 1 hour, while the simultaneous addition of comonomers was accomplished over a period of 5 hours at a rate of addition of 31 g/hour of HFPO and 4.8 g/hour of 1,2-epoxypentafluoropropane 3-fluorosulfate. The reaction mass was agitated for 1 hour after completion of the comonomer addition. An 11 g sample of HFPO was then added over a period of ½ hour and the reaction mass was agitated for a further 2 hours after completion of the HFPO addition. The organofluorine layer was isolated as described in Example 1 and methanolysis was carried out using 10 g of methanol. The polymer was washed three times with ethanol in 20 ml batches. The ethanol was removed by evaporation at 100° C. and the temperature of the reaction mass was raised gradually over a period of 6 hours to 260° C., while sweeping with compressed air. The product consisted of 10 g of a low molecular weight fraction and 170 g of colorless, clear end product having a number average molecular weight of approximately 8900 and a $T_g$ of $-62°$ C. in a yield of 93%. Elemental Analysis: Calc'd: C: 22.55, H: 0.18, F: 85.64; Found: C: 22.1, H: 0.22, F: 65.8. IR and NMR data indicated that the copolymer product contained structural units consisting of

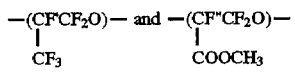

in a ratio of intensities of 9:1.

Cure of the ester copolymer was carried out according to the method of Example 1. The cured product had a tensile strength of 4.5 MPa, an elongation at break of 12-%, and a compression set of 5%. Tensile strength and elongation at break were determined according to ASTM D-412 and compression set was determined according to USSR Standard COST 9.029-74.

EXAMPLE 4

Copolymerization of 145 g (0.87 mole) HFPO and 26.6 g (0.11 mole) of 1,2-epoxypentafluoropropane 3-fluorosulfate was carried out substantially as described in Example 1 in the presence of 10 g (0.013 mole) of initiator in a solution of 25 g of perfluorotoluene with addition of 2.5 g of acetone. At the onset of polymerization 3.2 g of 1,2-epoxypentafluoropropane 3-fluorosulfate was added. The simultaneous addition of comonomers was accomplished over a period of 4 hours at a rate of addition of 33 g/hour of HFPO and 5.8 g/hour of 1,2-epoxypentafluoropropane 3-fluorosulfate. A 13 g sample of HFPO was added at the completion of the copolymerization. The entire polymerization was completed in 9 hours. The organofluorine layer was isolated as described in Example 1 and methanolysis was carried out substantially as described in Example 3. The product consisted of 9.5 g of a low molecular weight fraction and 152 g of colorless, clear end product having a number average molecular weight of approximately 11,300 and a $T_g$ of $-62.5°$ C. in a yield of 93%. Elemental Analysis: Calc'd: C: 22.66, H: 0.20, F: 65.28; Found: C: 23.2, H: 0.18, F: 65.8. IR and NMR data indicated that the copolymer product contained structural units consisting of

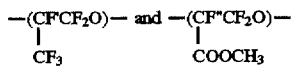

in a ratio of intensities of 7.9:1.

Cure of the ester copolymer was carried out according to the method of Example 1. The cured product had a tensile strength of 7.0 MPa, an elongation at break of 100%, and a compression set of 0%. Tensile strength and elongation at break were determined according to ASTM D-412 and compression set was determined according to USSR Standard GOST 9.029-7.

EXAMPLE 5

Copolymerization of 130 g (0.78 mole) HFPO and 28.5 g (0.12 mole) of 1,2-epoxypentafluoropropane 3-fluorosulfate was carried out substantially as described in Example 1 in the presence of 10 g (0.013 mole) of initiator in a solution of 22 g of perfluorotoluene with addition of 1.5 g of acetone. At the onset of polymerization 2.5 g of 1,2-epoxypentafluoropropane 3-fluorosulfate was added. The simultaneous addition of comonomers was accomplished over a period of 5.5 hours at a rate of addition of 21.5 g/hour of HFPO and 4.7 g/hour of 1,2-epoxypentafluoropropane 3-fluorosulfate. A 12 g sample of HFPO was added at the end of the copolymerization. The polymerization process took place over a period of 10 hours. The organofluorine layer was isolated as described in Example 1 and methanolysis was carried out substantially as described in Example 3. The product consisted of 7 g of a low molecular weight fraction and 138 g of colorless, clear end product having a number average molecular weight of approximately 10,800 and a $T_g$ of $-60.5°$ C. in a yield of 93%. Elemental Analysis: Calc'd.: C: 22.83, H: 0.24, F: 64.62; Found: C: 22.4, H: 0.25, F: 64.9. IR and NMR data indicated that the copolymer product contained structural units consisting of

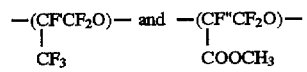

in a ratio of intensities of 6.5:1.

Cure of the ester copolymer was carried out according to the method of Example 1. The cured product had a tensile strength of 10.0 MPa, an elongation at break of 70%, and a compression set of 0%. Tensile strength and elongation at break were determined according to ASTM D-412 and compression set was determined according to USSR Standard GOST 9.029-74.

EXAMPLE 6

Copolymerization of 140 g (0.84 mole) HFPO and 35.0 g (0.14 mole) of 1,2-epoxypentafluoropropane 3-fluorosulfate was carried out substantially as described in Example 1 in the presence of 11.9 g (0.013 mole) of initiator in a solution of 22 g of perfluorotoluene with addition of 2.4 g of acetone. At the onset of polymerization 3.5 g of 1,2-epoxypentafluoropropane 3-fluorosulfate was added. The simultaneous addition of comonomers was accomplished over a period of 5 hours at a rate of addition of 25.2 g/hour of HFPO and 6.3 g/hour of 1,2-epoxypentafluoropropane 3-fluorosulfate. A 14 g sample of HFPO was added at the conclusion of the copolymerization. The polymerization process took place over a period of 10 hours. The organofluorine layer was isolated as described in Example 1 and methanolysis was carried out substantially as described in Example 3. The product consisted of 6.5 g of a low molecular weight fraction and 157 g of colorless, clear end product having a number average molecular weight of approximately 10,900 and a $T_g$ of $-60°$ C. in a yield of 94%. Elemental Analysis: Calc'd.: C: 22.92, H: 0.26, F: 64.32; Found: C: 22.5, H: 0.30, F: 69.1. IR and NMR data indicated that the copolymer product contained structural units consisting of

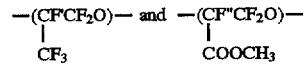

in a ratio of intensities of 6:1.

Cure of the ester copolymer was carried out according to the method of Example 1. The cured product had a tensile strength of 14.0 MPa, an elongation at break of 50%, and a compression set of 5%. Tensile strength and elongation at break were determined according to ASTM D-412 and compression set was determined according to USSR Standard GOST 9.029-74.

EXAMPLE 7

Copolymerization of 135 g (0.81 mole) HFPO and 45.0 g (0.18 mole) of 1,2-epoxypentafluoropropane 3-fluorosulfate was carried out substantially as described in Example 1 in the presence of 10 g (0.013 mole) of initiator in a solution of 25 g of perfluorotoluene with addition of 1.6 g of acetone.

At the onset of polymerization 4.5 g of 1,2-epoxypentafluoropropane 3-fluorosulfate was added. The simultaneous addition of comonomers was accomplished over a period of 6 hours at a rate of addition of 20.3 g/hour of HFPO and 6.7 g/hour of 1,2-epoxypentafluoropropane 3-fluorosulfate. A 13 g sample of HFPO was added at the completion of the copolymerization. The polymerization process took place over a period of 11 hours. The organofluorine layer was isolated as described in Example 1 and methanolysis was carried out substantially as describe in Example 3. The product consisted of 5.5 g of a low molecular weight fraction and 156 g of colorless, clear end product having a number average molecular weight of approximately 12,100 and a $T_g$ of −54° C. in a yield of 95%. Elemental Analysis: Calc'd.: C: 23.26, H: 0.33, F: 63.12; Found: C: 23.0, H: 0.38, F: 63.3. IR and NMR data indicated that the copolymer product contained structural units consisting of

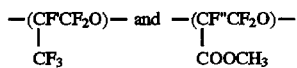

in a ratio of intensities of 4.5:1.

Cure of the ester copolymer was carded out according to the method of Example 1. The cured product had a tensile strength of 15.5 MPa, an elongation at break of 50%, and a compression set of 5%. Tensile strength and elongation at break were determined according to ASTM D-412 and compression set was determined according to USSR Standard GOST 9.029-74.

EXAMPLE 8

Copolymerization of 135 g (0.81 mole) HFPO and 56.5 g (0.23 mole) of 1,2-epoxypentafluoropropane 3-fluorosulfate was carried out substantially as described in Example 1 in the presence of 10 g (0.013 mole) of initiator in a solution of 25 g of perfluorotoluene with addition of 1.6 g of acetone. At the onset of polymerization 5.6 g of 1,2-epoxypentafluoropropane 3-fluorosulfate was added. The simultaneous addition of comonomers was accomplished over a period of 8 hours at a rate of addition of 15.2 g/hour of HFPO and 6.4 g/hour of 1,2-epoxypentafluoropropane 3-fluorosulfate. A 13 g sample of HFPO was added at the completion of the copolymerization. The polymerization process took place over a period of 13 hours. The organofluorine layer was isolated as described in Example 1 and methanolysis was carried out substantially as described in Example 3. The product consisted of 5.0 g of a low molecular weight fraction and 167 g of colorless, clear end product having a number average molecular weight of approximately 14,000 and a $T_g$ of −49° C. in a yield of 95%. Elemental Analysis: Calc'd.: C: 23.61, H: 0.41, F: 61.87; Found: C: 23.7, H: 0.45, F: 61.2. IR and NMR data indicated that the copolymer product contained structural units consisting of

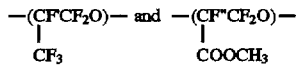

in a ratio of intensifies of 3.5:1.

Cure of the ester copolymer was carried out according to the method of Example 1. The cured product had a tensile strength of 18.0 MPa, an elongation at break of 50%, and a compression set of 5%. Tensile strength and elongation at break were determined according to ASTM D-412 and compression set was determined according to USSR Standard GOST 9.029-74.

EXAMPLE 9

Copolymerization of 166 g (1.0 mole) HFPO and 7.0 g (0.028 mole) of 1,2-epoxypentafluoropropane 3-fluorosulfate was carried out substantially as described in Example 1 in the presence of 10 g (0.013 mole) of initiator in a solution of 30 g of perfluorotoluene with addition of 2.5 g of acetone. At the onset of polymerization 0.6 g of 1,2-epoxypentafluoropropane 3-fluorosulfate was added. The simultaneous addition of comonomers was accomplished over a period of 4 hours at a rate of addition of 37.5 g/hour of HFPO and 1.6 g/hour of 1,2-epoxypentafluoropropane 3-fluorosulfate. A 16 g sample of HFPO was added at the completion of the copolymerization. The polymerization process took place over a period of 9 hours. The organofluorine layer was isolated as described in Example 1 and methanolysis was carried out substantially as described in Example 3. The product consisted of 15 g of a low molecular weight fraction and 155 g of colorless, clear end product having a number average molecular weight of approximately 8900 and a $T_g$ of −70° C. in a yield of 91%. Elemental Analysis: Calc'd. C: 21.92, H: 0.06, F: 67.83; Found: C: 21.5, H: 0.03, F: 68.3. IR and NMR data indicated that the copolymer product contained structural units consisting of

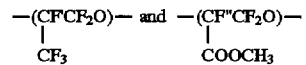

in a ratio of intensities of 35:1.

Cure of the ester copolymer was carried out according to the method of Example 1. The cured product had a tensile strength of 0.7 MPa, an elongation at break of 240%, and a compression set of 10%. Tensile strength and elongation at break were determined according to ASTM D-412 and compression set was determined according to USSR Standard GOST 9.029-74.

We claim:

1. A composition comprising a hexafluoropropylene oxide copolymer comprising copolymerized units of hexafluoropropylene oxide and another perfluoroalkylene oxide having functional groups, wherein the copolymer is of the general formula

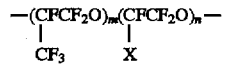

where

X=COF, COOR, $CONH_2$, $CONR^1R^2$, CN, COOH or $CH_2OH$;

R, $R^1$, and $R^2$=$C_1$–$C_8$ alkyl or $C_1$–$C_8$ fluoroalkyl;

m:n=2:1 to 50:1; and $M_n$=7,000 to 14,000.

2. The composition of claim 1 wherein X is —COOR.

3. The composition of claim 2 wherein R is methyl.

4. A process for preparation of perfluoroalkylene oxide copolymers which comprises A) providing a solution of an initiator composition which is a complex of a) a cesium alkoxide of a hexafluoropropylene oxide oligomer and b) a poly(ethylene glycol) dimethyl ether in an inert solvent;

B) mixing hexafluoropropylene oxide and 1,2-epoxypentafluoropropane-3-fluorosulfate, in a ratio of 2:1 to 50:1, with said initiator composition in a polymerization reaction zone to form a perfluoroalkylene oxide copolymer having cesium alkoxide moieties; and C) heating said perfluoroalkylene oxide copolymer having cesium alkoxide moieties to generate acid fluoride end groups, thereby forming a perfluoroalkylene oxide copolymer having the formula

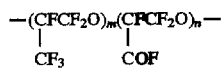

where m:n=2:1 to 50:1.

5. The process of claim 4 wherein the hexafluoropropylene oxide oligomer is a hexafluoropropylene oxide dimer.

6. The process of claim 4 wherein the poly(ethylene glycol) dimethyl ether is tetraglyme.

7. The process of claim 4 wherein the inert solvent is a perfluorinated aromatic compound.

8. The process of claim 7 wherein the perfluorinated aromatic compound is perfluorotoluene.

9. The process of claim 7 wherein acetone is additionally present in the reaction mixture of step B).

* * * * *